(12) United States Patent
Nguyen et al.

(10) Patent No.: US 7,079,264 B2
(45) Date of Patent: *Jul. 18, 2006

(54) PRINTER DRIVER SUPPORTING WORLDWIDE SINGLE BINARY FONT FORMAT WITH BUILT IN SUPPORT FOR DOUBLE BYTE CHARACTERS

(75) Inventors: Amanda Nguyen, Bothell, WA (US); Ganesh Pandey, Kirkland, WA (US); Alvin Scholten, Redmond, WA (US); Zhanbing Wu, Bellevue, WA (US); Eigo Shimizu, Seattle, WA (US); Peter Wong, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/139,333

(22) Filed: May 27, 2005

(65) Prior Publication Data

US 2005/0219598 A1    Oct. 6, 2005

Related U.S. Application Data

(63) Continuation of application No. 10/262,831, filed on Oct. 2, 2002, now Pat. No. 6,919,966, which is a continuation of application No. 09/157,917, filed on Sep. 21, 1998, now Pat. No. 6,490,051.

(51) Int. Cl.
*G06F 15/00* (2006.01)
*G06F 3/12* (2006.01)
*G06K 1/00* (2006.01)

(52) U.S. Cl. ............................... 358/1.1; 358/1.9
(58) Field of Classification Search ............... 358/1.9, 358/1.14, 1.13, 1.1, 1.15, 1.2, 539, 540, 426.02, 358/426.06

See application file for complete search history.

(56) References Cited

U.S. PATENT DOCUMENTS 5,604,843 A   2/1997  Shaw et al.
5,893,134 A   4/1999  O'Donoghue et al.

OTHER PUBLICATIONS

"The Unicode Standard Version 2.0," The Unicode Consortium, Addison-Wesley Press, 1997.

*Primary Examiner*—Douglas Q. Tran
(74) *Attorney, Agent, or Firm*—Lee & Hayes, PLLC

(57) ABSTRACT

A computer system and method for outputting printer commands to a printer in response to a print request from an application program are presented. The printer includes a device font whose characters are addressed for printing via a single, double, or n-byte code. The text data, however, utilizes the Unicode Standard to identify its characters. The system, therefore, includes a graphics device interface, which is compatible to read the Unicode data, to invoke the printer driver functions for controlling the outputting of the text data to the printer. A printer OEM supplied minidriver contains a characterization of the printer, including information identifying the device font resident in the printer and the code used to identify the individual characters of the font. A printer driver uses this information to translate the text data to be printed from the Unicode Standard to a code capable of selecting a device font provided character.

1 Claim, 6 Drawing Sheets

PRINTER DRIVER SUPPORTING WORLDWIDE SINGLE BINARY FONT FORMAT WITH BUILT IN SUPPORT FOR DOUBLE BYTE CHARACTERS

CROSS REFERENCE TO RELATED APPLICATIONS

This application is a continuation of and claims priority to U.S. patent application Ser. No. 10/262,831 filed on Oct. 02, 2002, now U.S. Pat. No. 6,919,966 which, in turn, is a continuation of U.S. application Ser. No. 09/157,917, filed on Sep. 21, 1998 now U.S. Pat. No. 6,490,051, the disclosures of which are incorporated by reference herein.

FIELD OF THE INVENTION

This invention relates to the printing of glyphs, and more particularly to the optimization of the selection and printing of glyphs whose characters are identified by multi-byte standards.

BACKGROUND OF THE INVENTION

Worldwide globalization has affected many industries, providing both tremendous opportunity and overwhelming problems. Many of these problems are related to the complex cultural differences between nations and their people, while some lie at a more basic level. One such basic problem is that of language. One industry in particular is acutely aware of this basic problem as language forms the basis for its operational systems and products. This industry is the computer industry.

While the computer industry has enjoyed a tremendous growth in the global market, problems relating to multi-language data input, processing, display, interchange, and printing have proved to be serious impediments to the realization of the potential growth of this industry on a worldwide scale. While humans are adept at mastering multiple languages, computer application programs and hardware drivers are generally written in one language to serve a primary market. Extension of these programs and drivers to other countries and other languages requires extensive redesign and re-coding, which delays the availability and increases the cost of such programs and drivers.

This problem exists because of the way that computers identify the various glyphs of worldwide languages. While computer programs operate internally on a binary basis, the requirement of a human interface forces the computers to display and print glyphs which are understandable to humans.

To allow for a readable human interface with the binary operation of the computer, various standards have been established to allow a computer to print and display human readable glyphs. One such standard is the American Standard Code for Information Interchange (ASCII) which utilizes a 7-bit code and 8-bit extensions to identify either 128 or 256 different glyphs respectively. While such a standard is adequate to display and print glyphs utilized in the English language, it does not include provision for many international characters used around the world. Therefore, to allow for display and printing of characters utilized in other languages, various other standards, such as the ISO International Register of Character Sets, the ISO/IEC 6937 and ISO/IEC 8859 families of standards, as well as the ISO/IEC 8879 (SGML) standards, were developed. Other national and industry standards were also developed (including code pages and character sets from Adobe, Apple, Fujitsu, Hewlett Packard, IBM, Lotus, Microsoft, NEC, WordPerfect, and Xerox).

Unfortunately, these various national and international standards cannot utilize common coding of their glyphs because only 256 separate glyphs can be addressed with 8 bits. This lack of a common representation for a given glyph code presents serious problems when international exchange of data through, for example, e-mail is considered. Specifically, if a user generates an e-mail message utilizing one national standard, transmits that message to auser in a different country whose computer operates on a different national standard, the characters displayed to the recipient of the e-mail message will quite likely be garbled. This is because his graphics device interface (GDI) will interpret the glyph codes differently than the application program from which the message was generated.

To further complicate the international computing language problem, many of the Far East languages utilize character sets which have well over 20,000 glyphs which must be displayed and printed. Unfortunately, a single byte coding of these characters will only be able to address a maximum of 256 of these over 20,000 glyphs by using all 8 bits in a single byte. Recognizing this problem, application program developers and computer hardware manufacturers have developed yet another coding standard which utilizes 2 bytes (16 bits) to identify these Far Eastern characters. However, as described above, the requirement of a separate interface type function requires additional programming, increased cost, and delayed availability of many programs originally developed for western application.

Recognizing this problem, the Unicode Consortium was formed in 1988 to develop a true global character identification standard. The goal of this consortium was to develop a standard which would allow the unique identification of all of the world's characters for every modern and many ancient languages. As a result of their efforts, the Unicode consortium has developed the Unicode Standard, now in version 2.1, available from Addison-Wesley Developers Press 1997, with updates and modifications available on the Internet at http://www.unicode.org. This standard is hereby incorporated by reference.

The Unicode Standard utilizes a double byte system (16 bits) which allows the unique identification of 65,536 separate characters. While this number is anticipated to be more than sufficient to individually identify characters from all the world's languages, one million additional characters are accessible through the surrogate extension mechanism, were two 16-bit code values represent a single character. While full implementation of the Unicode Standard is anticipated to overcome the problems described above, a vast majority of the computer hardware and software available and in use today does not recognize the Unicode double byte character identification standard. Much of the hardware and software existing in the western world currently only understands single byte characters, and therefore will continue to require additional coding to allow utilization on an international scale.

One such piece of computer equipment in widespread use is the computer printer. While a computer printer can print any glyph, English, international, as well as Far Eastern glyphs, the mechanism by which a majority of these international characters are printed greatly handicaps the printing performance of the device. This is because the printing of international characters is accomplished by the computer interpreting the international character as a bitmap graphic, and transmitting the bitmap image data to the printer to allow the printer to draw the international character as a bitmap picture of the character. This typically requires approximately 2,000 bytes of data to be transmitted to the printer to print a single international character. Even with the high speed, sophisticated equipment available today, this transfer of bitmap data to allow a printer to draw an international character greatly slows the printing performance of the device.

To allow for enhanced printing performance, most printers include device fonts which are resident within the printer itself and require only the unique identification of a glyph to be transferred to it to allow priority of that glyph. This simple transfer of a unique identifying code typically uses one of the above identified 8-bit standards such as, e.g., ASCII. A font is a complete assortment of characters that have common design and size. Atypical font supports more than 256 characters. So, the characters within a font must be grouped into multiple symbol sets each having only 256 characters. Therefore, the symbol set identifies a specific collection of symbols provided by the font, with each symbol set being defined with a specific application in mind. For example, a German language symbol set will have German language specific symbols, while an English language symbol set will have only English symbols. Unfortunately, current printer drivers are unable to switch between symbol sets, requiring that separate drivers be provided to allow the enhanced printing performance of device fonts for each separate language. That is to say, a computer operating in America requires a different printer driver then a computer operating in, e.g., Germany to be able to use device fonts to print. As discussed above, this increases the development time, increases the cost, and delays the availability of these programs on an international basis. This problem is acute when importation into Far East countries is considered. As described above, the shear number of characters which must be printed requires 2 bytes to identify each character. Therefore, the development time and cost are greatly increased for release of these programs in the Far Eastern countries.

In addition to the tradeoff between the speed of utilizing device fonts with the associated increased development and support costs versus the reduced printing performance of printing international characters as bitmaps. Since a font describes not only the height, pitch, style, stroke, weight, typeface, and orientation of a character, but also its spacing, reporting the widths of the characters precisely to the application is very important for correct formatting. Specifically, most western characters are printed on a proportional basis whereby the space a character takes up on the printed page is proportional to its character width. That is to say, an "i" is given less space on a page then a "W". Other languages, Far Eastern languages in particular, utilize fixed spacing for its characters, i.e. all characters occupy the same width regardless of the width of the individual character. If English were printed in a fixed pitch, both the "i" and "W" would be given the same width space on the printed page, regardless of the fact that the "i" has a much narrower width then the "W". Unfortunately, current printer drivers are unable to switch between these printing formats, which results in the printed document being different than the same document viewed on a display. This is because, e.g., in Far Eastern countries documents containing both English and Far Eastern characters are all printed in fixed pitch.

There is, therefore, a need for a printer driver which is able to interpret, and therefore take advantage of, the new Unicode Standard, but which is also able to utilize the device fonts of existing printers. There is also a need for a printer driver which supports multiple symbol sets to allow full support of all characters in a font thereby precluding the need for separate printer drivers to be developed for particular countries' applications, and which is able to switch between fixed and proportional pitch printing for eastern and western characters in the same document.

SUMMARY OF THE INVENTION

In view of the above described problems existing in the art, a preferred embodiment of the instant invention comprises a printer driver which has the capability of correctly printing all glyphs from all languages, and which does so in an optimized fashion through maximum utilization of printer device fonts. This printer driver of the instant invention includes full Unicode Standard support for double byte character identification. Advantageously, the printer driver of the instant invention is also capable of translating the double byte Unicode character standard into proper format for utilization by a printer device in printing the glyphs using, to the maximum extent possible, device fonts stored therein. Specifically, a preferred embodiment of the instant invention translates the Unicode Standard character identifiers into n-byte printer character codes to select an individual symbol set with a device font and to select an individual character within the selected individual symbol set of the device font to enhance printer performance.

In a preferred embodiment of the instant invention, the printer driver is modular and extensible. The modularity of a preferred embodiment of the instant invention allows new fonts or new glyphs to be added without requiring a change to the base driver by simply modifying an appropriate sub-module within the driver. This results in reduced support and maintenance costs as well as increased flexibility in supporting new device fonts as they are made available.

These and other features, aspects, and functions of the invention will become more apparent from the following detailed description when taken in conjunction with the accompanying drawings.

Figure 1:
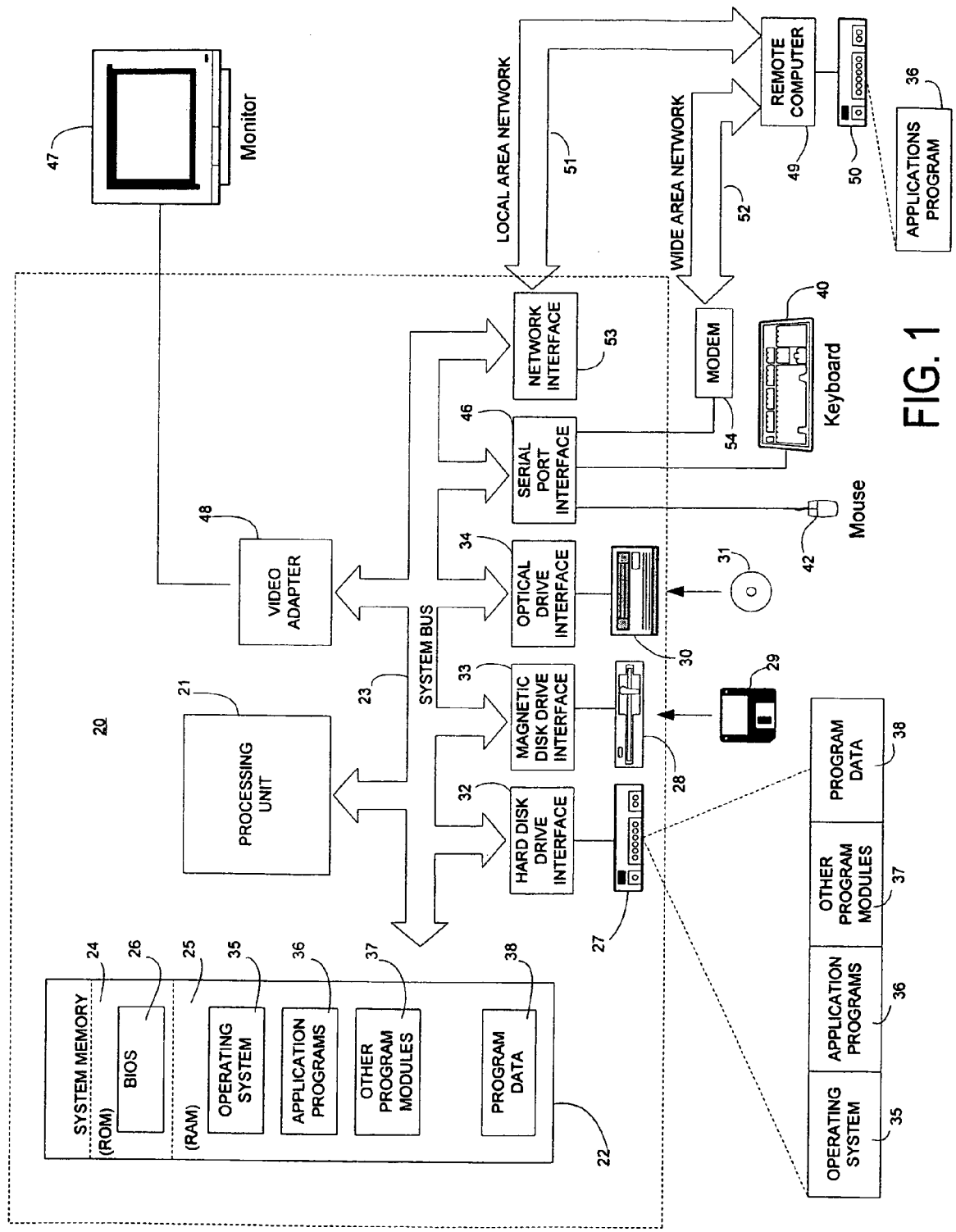
FIG. 1 is a simplified block diagram illustrating an exemplary operating environment suitable for application of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE INVENTION

FIG. 1 in the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, microprocessor systems, microprocessor-based or programmable computer electronics, network PCs, minicomputers, mainframe computers, and the like. The invention may also be practiced and distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purposed computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other date for the personal computer 20. Although the exemplary environment described herein employs a hard disk, a removable magnetic disk 29 and a removable optical disk 31, it should be appreciated by those skilled in the art that other types of computer readable media which can store data that is accessible by the computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system busy 23 via an interface, such as a video adapter 48. In addition to the monitor, personal computers typical include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN working environment, the personal computer 20 is connected to the local network 51 through a network interface or adapter 53. When used in a WAN networking environment, the personal computer 20 typically includes a modem 54 or other means for establishing communications over the y-area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing the communications link between the computers may be used.

Having now described both the problem existing in the art and a suitable environment into which the solution provided by the printer driver of the instant invention is suitably applied, the focus is now turned to a description of an embodiment of the printer driver of the instant invention. The printer driver of the instant invention is preferably a Universal Printer Driver (Unidrv5) which may be implemented in an operating system, such as Windows NT5.0. As such, original equipment manufacturers (OEMs) are able to provide customization components (plugins) to modify both the standard driver user interface and the output data stream which is sent to the printer. A simplified view of the data flow between the components of the universal printer driver of the instant invention and the OEM developed generic printer description (GPD) file is illustrated in FIG. 2.

Figure 2:
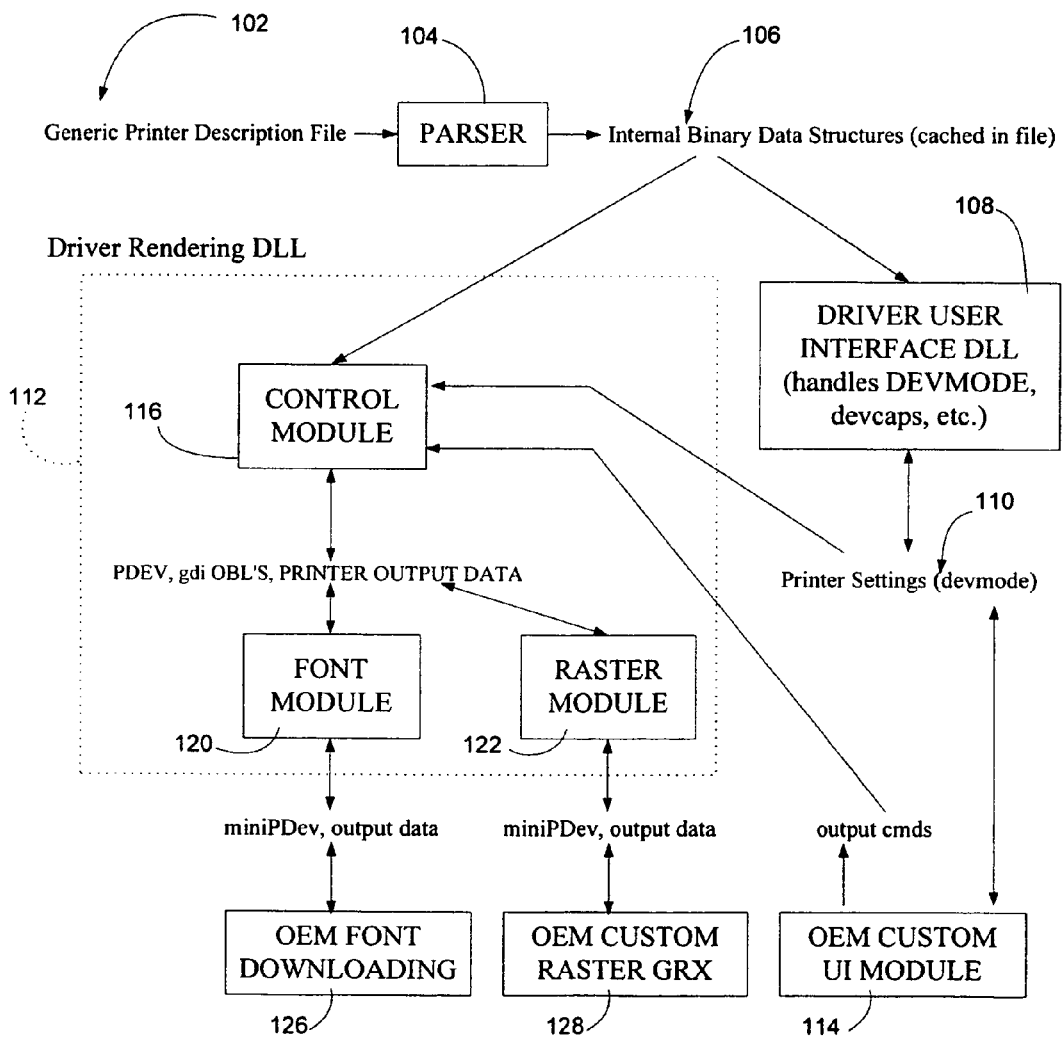
FIG. 2 is a simplified block diagram illustrating data flow between components of an embodiment of the instant invention.

As may be seen from this FIG. 2, the driver architecture is open, i.e. the OEMs are allowed to plug-in custom functions wherever appropriate. This allows the architecture to be very extensible, allowing OEMs to support new printers, features, and fonts between additional releases of the universal driver of the instant invention. Additionally, because most OEMs presumably know better how to generate outputs tailored for their specific printers, and also which device fonts are included within their particular printers, better graphics and text quality also results, especially for ink jet printers. As may be seen from FIG. 2 the driver architecture is also modular. This modular driver architecture is composed of multiply well-defined modules based on functionality. Any particular printer may use some or all of these modules as desired by the OEM. The unidriver of the instant invention functions with no significant performance degradation simply due to the existence of any non-utilized module.

A generic printer description (GPD) file 102 has a significant influence on the driver's flexibility. A detailed description of the GPD format, features,and advantages is included in co-pending application Ser. No. 09/157895, filed on even date herewith for a MODULAR AND EXTENSIBLE PRINTER DEVICE DRIVER AND TEXT BASED METHOD FOR CHARACTERIZING PRINTER DEVICES FOR USE THEREWITH, assigned to the assignee of the instant application, the disclosure and teachings of which are hereby incorporated by reference. The GPD parser 104 parses the text based GPD file into internal binary data structures 106. The driver accesses this binary data structures 106 unless the GPD file 102 has since been updated. The parser 104 also generates helpful error and warning messages for improper GPD files.

The driver user interface (UI) DLL 108 is a separate DLL but handles all device capability/setting queries and presents the graphical user interface (GUI). This DLL 108 interacts with the user and applications, and it provides the device settings 110 for the rendering driver 112. The support provided by the driver user interface DLL of OEM custom UI 114 exists at two different levels. First, the OEM adds customer items and/or makes minor changes to the standard UI. In this scenario the driver controls the UI and its overall look and feel. Second, the OEM may replace the UI DLL 108 completely for cases where the first level of support cannot accommodate the OEM requirements.

The driver rendering control 112 covers all non-UI related DDI calls that use the parameter pdev. The driver rendering DLL's 112 primary function is to convert DLL calls into printer-specific data and send them to the spooler. This DDL 112 also handles information queries regarding the device surface, such as fonts, brushes, colors, etc.

The control module 116 within the driver rendering DLL 112 initializes the driver data structures and sets up the dispatch for rendering DDI calls based on the printer's capability. It also handles banding and dumping raster data to the printer. Both banding and non-banding methods are supported.

Also within the driver rendering DLL 112 are a font module 120, and a raster module 122. The font module 120 enumerates device fonts and handles TextOut DDI, including downloading true type fonts to the printer. This module 120 will handle interfacing with font downloaders. The driver also supports gray scale fonts, including both bitmap fonts and device fonts. The raster module 122 handles all bitmap related DDI calls, whether the target is the banding buffer, or the printer's surface. This module 122 also supports OEM custom half-toning and color correction DLL interface. It also supports OEM custom dithering patterns. As with the user interface, the OEM may supply modules 126, 128 to supplement, modify, or replace the above modules 120, 122.

Figure 3:
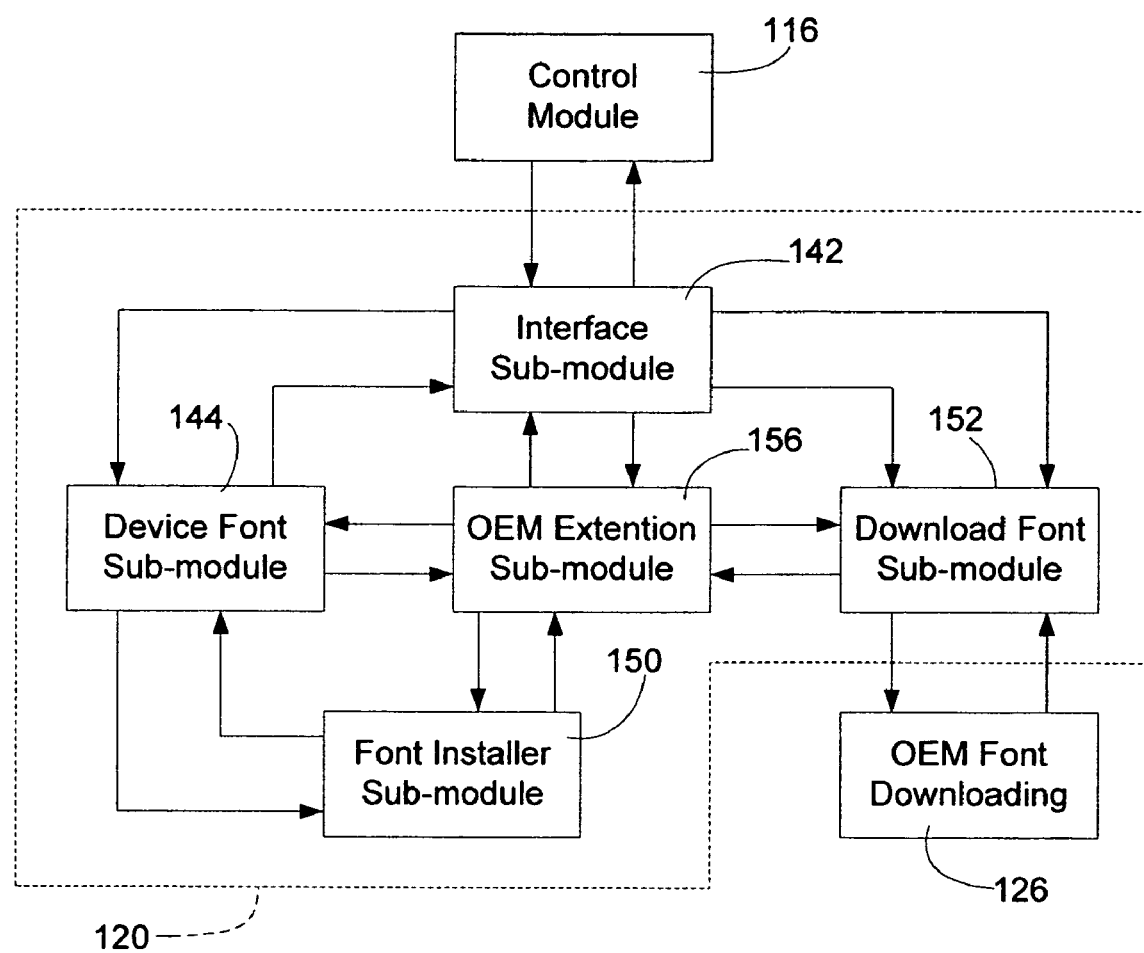
FIG. 3 is a simplified block diagram illustrating in greater detail a particular aspect of an embodiment the instant invention as illustrated in FIG. 2.

The font module 120 is preferably a self-contained module which is divided into five sub modules as illustrated in FIG. 3. The first is the interface sub-module 142 which performs the interface function between the control module 116 and,the other sub-modules. This interface sub-module 142 also frees all of the resources allocated, and provides the helper function to set the brush, fore ground color, etc.

The second constituent of the font module 120 is the device font sub-module 144 illustrated in FIG. 3. Since most printers include and are able to utilize device fonts to tremendously enhance printing performance, this module 144 handles all of the driver device interface (DDI) Font Management calls for these device fonts. Additionally, this sub-module 144 handles using a device font, and performs the font substitution of TrueType fonts for device fonts to further enhance performance. The interaction with an OEM extension module for call back to output a character or other font specific command callback is also handled by this sub-module 144. This sub-module will also handle the device fonts for serial printers. The text to be printed for these serial printers is cached until DrvSendPage, and then it is sent along with the graphics. This involves interaction with the raster module 122 (see FIG. 2) of the universal printer driver. Additionally, the font module 120 supports a soft font installer which allows a soft font to behave like a device font, and handles the soft font specific functions by interacting with the font installer sub-module 150 described below. The universal printer driver (Unidrv5) includes TrueType font substitution support, and this sub-module includes the necessary support for actually performing the font substitution.

The third constituent of the font module 120 is the download font sub-module 152 illustrated in FIG. 3. This sub-module 152 is responsible for downloading fonts in different formats. It also interacts with the OEM extension module for specific callbacks. Most of the work performed by this sub-module 152 concerns the management of glyph information and downloaded font. The fourth constituent of the font module 120 is the OEM extension sub-module 156, and will provide callback support for fonts. In an exemplary embodiment, the functionality of this sub-module 156 is implemented in each related module, as opposed to being a separately coded sub-module. The final constituent of the font module 120 is the font installer sub-module 150. This sub-module 150 takes care of the fonts installed by the font installer and provides information to other modules about them. This module 150 also interacts with the device sub module 144. As will now be recognized by one skilled in the art, the modularity of the font module 120 allows for ease of addition or replacement of any new sub-module, while at the same time making the maintenance of the code easier.

The interface sub-module 142 interacts with the control module 116, and passes to it various items of information needed by the control module 116. The interface sub-module 142 is preferably responsible for freeing various data structures, and also creates the necessary data structures for the device sub-module 144 by parsing the information given by the GPD parser 104 (FIG. 2).

As mentioned above, the font module 120 controls font substitution. Font substitution is a means of achieving balance between document portability and printing performance. Specifically, font substitution refers to the substitution of a device font for TrueType fonts when printing a document. Since TrueType fonts need to be downloaded in order to be printed, which takes time to perform, the substitution of device fonts, which are resident in the printer itself greatly enhances the printing performance.

The device font sub-module 144 essentially handles the printer device font resource, glyph translation, the data transition between GDI and Driver, and the actual printing 146.

Figure 4:
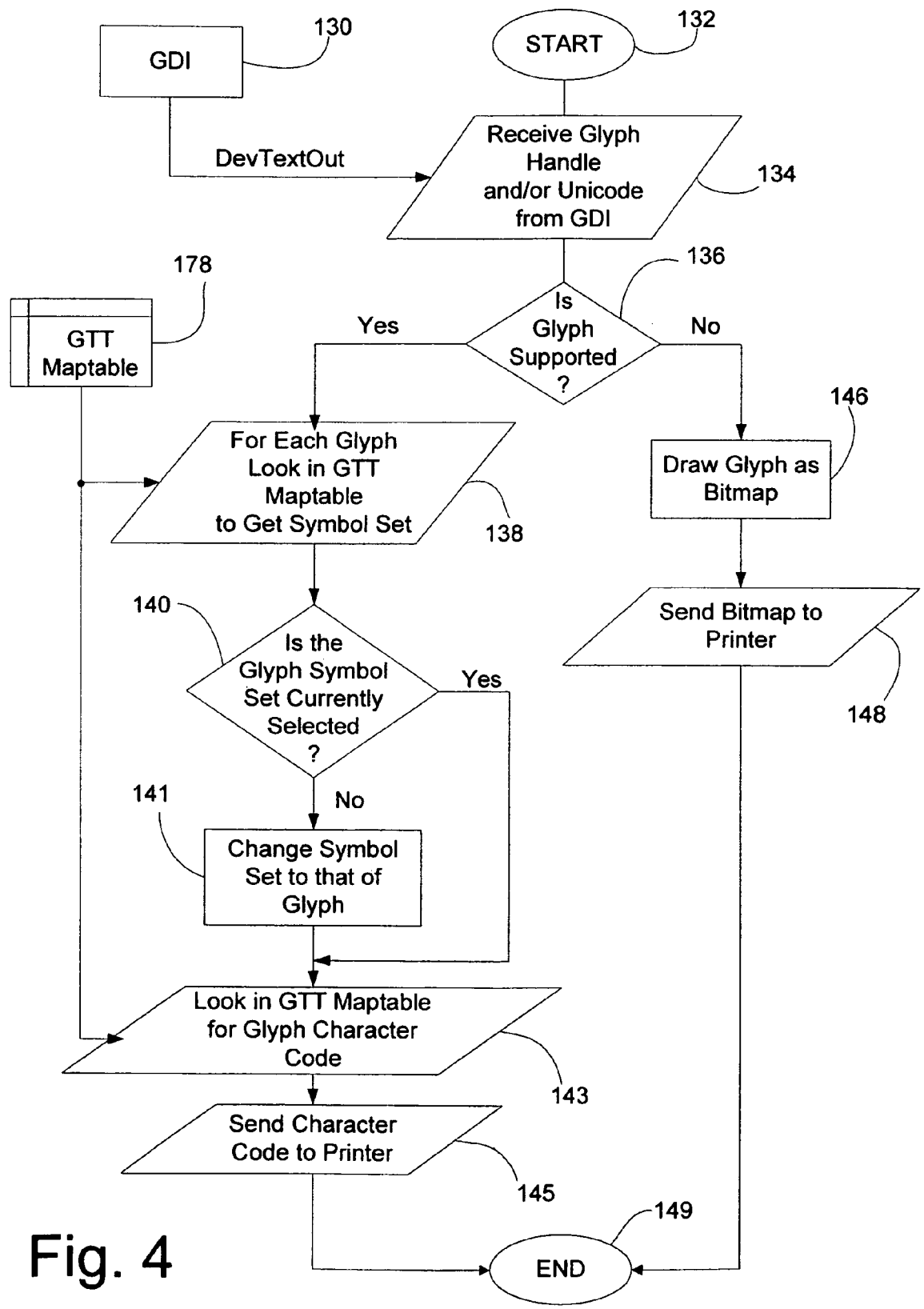
FIG. 4 is a functional flow diagram illustrating character code handling and conversion in accordance with the teachings of the instant invention.

The actual data translation accomplished by a preferred embodiment of the instant invention is illustrated in flow diagrammatic form in FIG. 4, to which specific reference is now made. Once the system of the instant invention is initiated 132, it is capable of receiving 134 glyph handle and/or Unicode character identification information from the graphics device interface (GDI) 130. Once it has received this information, the driver of the instant invention determines whether or not the particular glyph to be printed is supported by a device resident font 136. If this glyph is supported by a device resident font, the driver next looks 138 in the glyph translation table's (GTT's) map table 178 to determine the particular symbol set in which the desired glyph is supported. The driver next determines 140 whether the symbol set in which the desired glyph is supported is the symbol set which is currently selected. If the currently selected symbol set is not that required to support the desired glyph, the driver changes 141 the symbol set to that in which the desired glyph is supported. Once changed 141, or if the symbol set is already selected, the driver next looks 143 in the GTT's map table 178 to retrieve the individual glyph's character code to allow proper selection of the printer resident font character to be printed by the printer. Once this translation is complete, the driver then sends 145 the character code to the printer to be printed, thus completing 149 the translation from the code information received from the GDI 130 to the correct code needed to select and utilize the device resident font for the printing of the characters.

While the translation of the multi-byte code utilized by application programs to a code which allows the individual selection of characters supported by a device resident font significantly enhances the printing performance of a printer, the possibility exists that not all characters generated by an application program may be supported by a particular printer's device resident font. Once the driver of the instant invention has determined that the desired glyph to be printed is not supported 136 by a device resident font within the printer, the driver then draws 146 the glyph as a bitmap image to be printed. Once drawn, the driver sends 148 this bitmap image to the printer to allow the printer to draw the character's glyph on the printed document. While this bitmap drawing is required when the particular glyph is not supported by a device resident font, the translation performed by the driver of the instant invention from one character code to that recognized and supported by a device resident font significantly enhances the printing performance over prior printer drivers which required the drawing of bitmap images for all characters not within a single symbol set of the device resident font.

Figure 5:
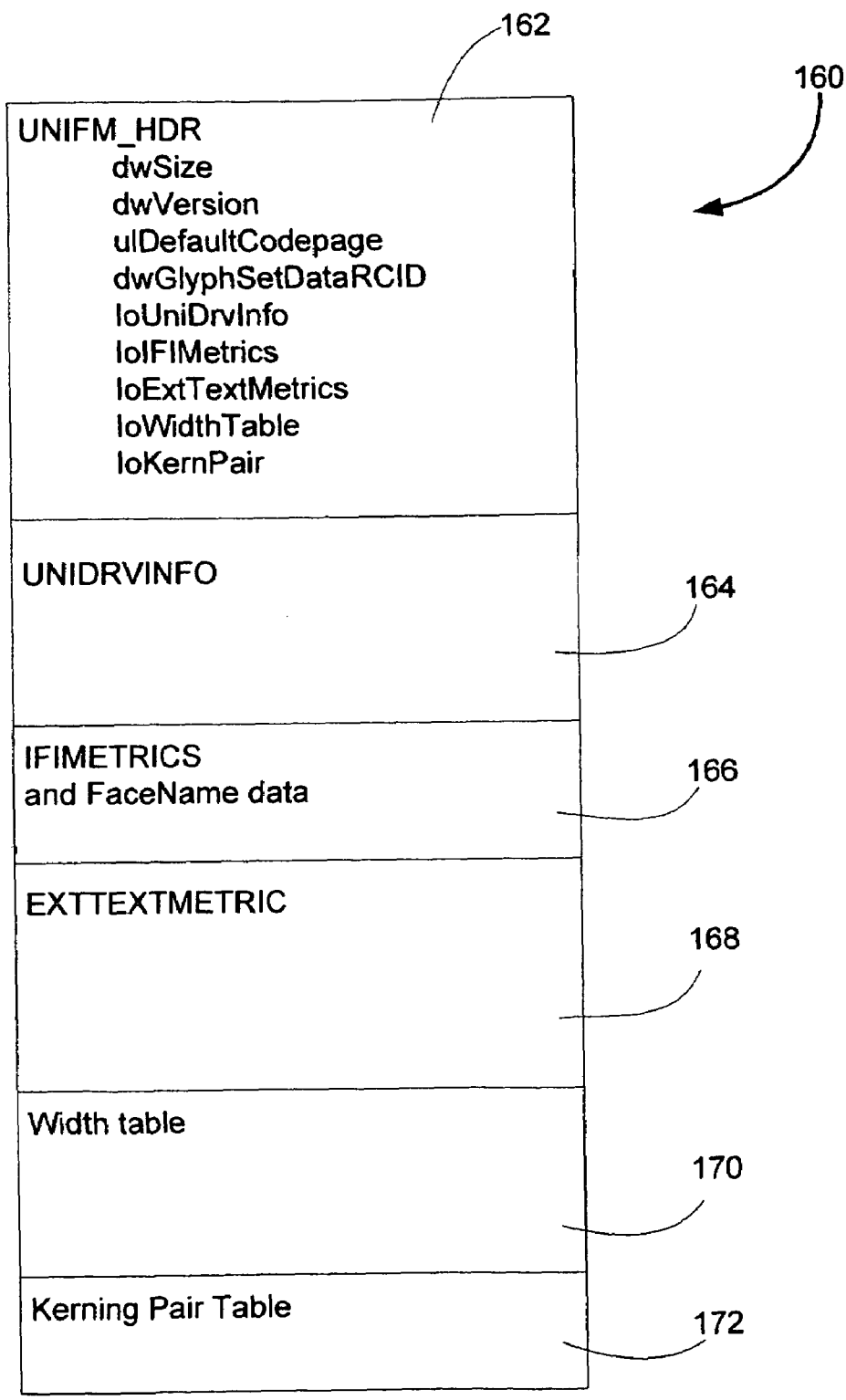
FIG. 5 is a simplified data structure image of a universal driver font metric constructed in accordance with an embodiment of the instant invention.

In accordance with a preferred embodiment of the instant invention, FIG. 5 illustrates a data structure image of the universal driver font metrics (UFM) 160. The UFM 160 data represents the information of font, IFIMETRICD, character width table, kerning pair, etc. Specifically with reference to FIG. 5, the UNIFM_HDR 162 is the universal printer driver (Unidrv5) font file (UFM) header, and has the following structure:

```
typedef struct
{
    DWORD   dwSize;
    DWORD   dwVersion;
    ULONG   ulDefaultCodepage;
    LONG    lGlyphSetDataRCID;
    DWORD   loUniDrvInfo;
    DWORD   loIFIMetrics;
    DWORD   loExtTextMetric;
    DWORD   loWidthTable;
    DWORD   loKernPair;
    DWORD   dwReserved[2]
} UNIFM_HDR, *PUNIFM_HDR;
```

In this exemplary structure, dwSize represents the total size of this font resource data, and dwVersion the version number of the font file. The ulDefaultCodepage is a Windows codepage value of this font's default code page. A minidriver used in association with UNIDRV5 usually comprises a GPD file and a resource DLL. This resource DLL contains the UFM files, GTT files, and some resource strings. The UFMs and GTTs are file resources in the resource file, and each have their own resource ID. GlyphSetDataRCID is the resource ID of GTT. If lGlyphsetDataRCID points to a glyph translation table (GTT) resource, then this value has to be the same as UNI_GLYPHSETDATA's first CODEPAGEINFO codepage value and must be a positive number. If lGlyphSetDataRCID is a predefined character conversion ID, then this value has to be same as the predefined character conversion's codepage (which then is a negative number). If, however, lGlyphSetDataRCID is CC_DEFAULT is defined as 0, glyph handles are created on the fly by UNIDRV5 from ulDefaultCodepage, wcFirstChar and wcLastChar in UFM. UlDefaultCodepage should have a specific code page value. If during PFM to universal driver font metrics (UFM) conversion this value becomes zero, then the converter will set this value to 1252 which corresponds to the US ANSI code page.

lGlyphSetDataRCID is a resource ID of GLYPHDATA in a minidriver resource DLL (positive resource ID number), or system predefined glyph translation ID (negative predefined GTT ID). If the resource ID is 0, then for GLYPHDATA a DefaultCTT GPD entry is used. If, however, the generic printer description (GPD) file doesn't specify DefaultCTT or if DefaultCTT is 0 and dwGlyphSetDataRCID is also 0, then glyph handles are created using ulDefaultCodepage value. The variable loUniDrvInfo is a DWORD offset value from the top of a file header to the UNIDRVINFO 164 data. The variable loIFIMetrics is also a DWORD offset value from the top of a file header pointing to the IFIMETRICS 166 data. The IFIMETRICS 166 data structure is preferably identical with the DDK definition. Finally, loExtTextMetric is a DWORD offset value from the top of a file header to the EXTTEXTMETRIC 168 data structure, loWidthTable is a DWORD offset value from the top of a file header to the WIDTHRUN 120 data structure, and loKernPair is a DWORD offset value from the top of a file header to the KERNPAIR 172 data structure.

The following is an example of a minidriver defined GTT in which ulDefaultCodepage is the first codepage value in the specified GTT:

lGlyphSetDataRCID=14;// This is a minidriver defined GTT.

The following is an example of a system predefined character conversion ID in which ulDefaultCodepage is a corresponding value to these system predefined character conversion:
  lGlyphSetDataRCID=−1,−2,−3,
    −10,−11,−12,−13,−14,−15,−16,−17,−18;//
These are system predefined character conversion IDs.
  lGlyphSetDataRCID=−1;
  ulDefaultCodepage=437;

The following is an example of a default character conversion ID in which UFM has to specify a correct codepage value in ulDefaultCodepage (CP_ACP is preferably not set in this case):
  lGlyphSetDataRCID=CC_DEFAULT;

wType represents a following type of font:

| | |
|---|---|
| FTYPE_HPINTELLIFONT(0) | HP's Intellifont |
| FTYPE_TRUETYPE(1) | HP's PCLETTO fonts on LJ4 |
| FTYPE_PST1(2) | Lexmark PPDS scaleable fonts |
| FTYPE_CAPSL(3) | Canon CAPSL scaleable fonts |
| FTYPE_GENERAL4) | General fonts | fcaps represents device font capabilities. The following flags disable certain font simulations for particular device font:

| | |
|---|---|
| DF_NOITALIC | Specifies that the device font cannot be italicized using the italic simulation. |
| DF_NOUNDER | Specifies that the device font cannot be underlined using the underline simulation. |
| DF_XM_CR | Specifies that the Universal Printer Driver should send a carriage-return command after rendering a line of text with this font. |
| DF_NO_BOLD | Specifies that the device font cannot be made bold using the bold simulation. |
| DF_NO_DOUBLE_UNDERLINE | Specifies that the device font cannot be double-underlined using the double-underline simulation. |
| DF_NO_STRIKETHRU | Specifies that the device font cannot be struck through using the strikethrough simulation. |
| DF_BKSP_OK | Specifies that a single backspace will be sent when using a character-translation table that uses strikeover characters. If this bit is not set, and the font uses a GLYPHDATA, explicit x-movement commands are required. |

With reference again to FIG. 5, the data structure segment UNIDRVINFO 164 is used to define printer specific information. dwSize identifies a size of this data structure including Select and UnSelect font commands appended to the end.

```
typedef struct _UNIDRVINFO
{
  DWORD  dwSize;
  DWORD  flGenFlags;
  WORD   wType;
  WORD   fCaps;
  WORD   wXRes;
  WORD   wYRes;
  short  sYAdjust;
  short  sYMoved;
  WORD   wPrivateData;
  short  sShift;
  INVOC  SelectFont;
  INVOC  UnSelectFont;
  WORD   wReserved[4];
} UNIDRVINFO, PUNIDRVINFO;
``` flGenFlags fields is used to specifyi following font type:

| | |
|---|---|
| UFM_SOFT(0x00000001) | Softfont, thus needs Downloading |
| UFM_CART(0x00000002) | This is a cartridge font |
| UFM_SCALABLE(0x00000004) | Font is scaleable |

The remainder of the data structure members are as follows:
  wXRes represents font X resolution.
  wYRes represents font Y resolution.
  sYAdjust represents adjust Y position before output—for double height characters on dot matrix.
  sYMoved represents that the amount of cursor shift after printing font wPrivateData is used for Special purpose: e.g. DeskJet permutations.
  sShift represents a number of pixel to shift each char by. Used by MS Z1a cartridge.
  SelectFont has a font selection command.
  UnSelectFont has a font unselection command.
  The INVOC structure is defined by GPD parser as follows, and the offsets of these strings are from the top of this structure.

```
typedef struct {
  DWORD  dwCount;  // number of elements in the array
  DWORD  loOffset; // byte-offset to the beginning of the array
}INVOC, *PINVOC;
```

In this structure, wReserved is for DWORD align and a future use.

In the data structure of FIG. 5, the IFIMETRICS 166 is returned to GDI via DrvQueryFont. This is exactly same as a DDK definition. The IFIMETRICS's facename members have offset values to the facename string. The actual offset is the difference from the top of this structure 166 to the string. This segment supports the dpFontSim feature, as well as the FONTSIM and FONTDIFF structure. Further, the dpCharSet feature is supported which makes it possible to support multiple character sets in one IFIMETRICS 166. Both of these features are supported by GDI and the universal printer driver (Unidrv5) in the Windows NT5.0 environment.

The EXTTEXTMETRIC 168 data structure illustrated in FIG. 5 represents the extended-textmetric information for a font. All the measurements are given in the specified units, regardless of the current mapping mode. This data structure is preferably identical to the Windows 3.1 (or 95) EXT-TEXTMETRIC data structure known in the art.

The Width Table data structure 170 in FIG. 5 represents the character width table which is a continuous GLYPH-HANDLE based table. The glyph handles are contiguous and are created in ascending order for the supported Unicode range. To create these handles, all supported Unicode runs are expanded and sorted. Once expanded and sorted, the first Unicode glyph handle is 1, second is 2, and so on. If the font has a specified GTT, then the glyph handles are saved in a GTT file, and wStartGlyph is set using this GTT file. If the font has a predefined GTT, then the Glyph Handles are saved in a predefined GTT file, and wStartGlyph is set using this predefined GTT file. If, however, the font has no specified GTT (lGlyphSetDataRCID==CC_DEFAULT), then the Glyph Handles are created using ulDefaultCodepage. The following is an exemplary structure:

```
typedef struct_WIDTHTABLE {
   DWORD  dwSize;
   DWORD  dwRunNum;
   WIDTHRUN WidthRun[1];
} WIDTHTABLE, *PWIDTHTABLE;
typedef struct_WIDTHRUN {
   WORD   wStartGlyph;   // index of the first glyph
   WORD   wGlyphCount;   // number of glyphs covered
   DWORD  loCharWidthOffset; // glyph width
} WIDTHRUN, *PWIDTHRUN;
```

In this structure, wStartGlyph specifies the index of the first glyph in this run, and wGlyphCount specifies the number of glyphs in this run. The array has wGlyphCount elements and each element is the character width for a single glyph. The first width corresponds to the glyph index wStartGlyph and so on. The byte offset is relative to the beginning of WIDTHTABLE 170 structure and is preferably WORD-aligned. Since Western proportional device fonts typically have variable pitch characters, dwRunNum is set to 1 and loCharWidthOffset is a pointer to a width vector of all characters. In the case of Far Eastern device fonts, however, IFIMETRICS.fwdAveCharWidth and IFIMETRICS.fwdMaxCharWidth are used for single byte and double byte characters to identify their width. If a font is proportional, a UFM has a WIDTHTABLE which represents only the proportional pitch characters. The other characters use fdwAveCharWidth and fwdMaxCharInc for single and double byte characters. Preferably, the array of WIDTHRUNs is sorted so that the wStartGlyph values are in ascending order. This ensures that the driver can use a binary search to quickly find the width for any given glyph index.

The KERNPAIR data structure 172 of FIG. 5 represents kerning pair information. Preferably, this kerning pair table has a Unicode base, not a glyph handle base. This is different from the width table just discussed. In Windows NT, the DDI requires that FD_KERNPAIR is Unicode base. The kerning pairs are preferably stored in increasing order. The primary key in the kerning pair is the second Unicode character, while the secondary key is the first Unicode character in the kerning pair. As an example:

```
typedef struct
{
   DWORD dwSize;
   DWORD dwKernPairNum;
   FD_KERNPAIR KernPair[1];
} KERNDATA;
```

Where dwSize is the total size of this structure including kerning pair array, and dwKernPairNum represents the number of kerning pairs in the array. Further:

```
typedef struct FD_KERNINGPAIR {
   WCHAR wcFirst;
   WCHAR wcSecond;
   FWORD fwdKern;
} FD_KERNINGPAIR;
```

Where the FD_KERNINGPAIR structure is the same as the DDK FD_KERNINGPAIR structure.

In this example, wcFirst specifies the code point of the first character in the kerning pair, and wcSecond specifies the code point of the second character in the kerning pair. Additionally, fwdKern specifies the kerning value in font (notional) units for the kerning pair. If this value is greater than zero, the characters will be moved apart, otherwise, the characters will be moved together. An array of FD_KERNINGPAIR structures must be zero-terminated, which means that the last FD_KERNINGPAIR structure in the array has all structure members set to zero. An array of FD_KERNINGPAIR structures is preferably sorted in increasing order according to an unsigned 32-bit key, calculated as follows:

wcFirst+65536*wcSecond.

Figure 6:
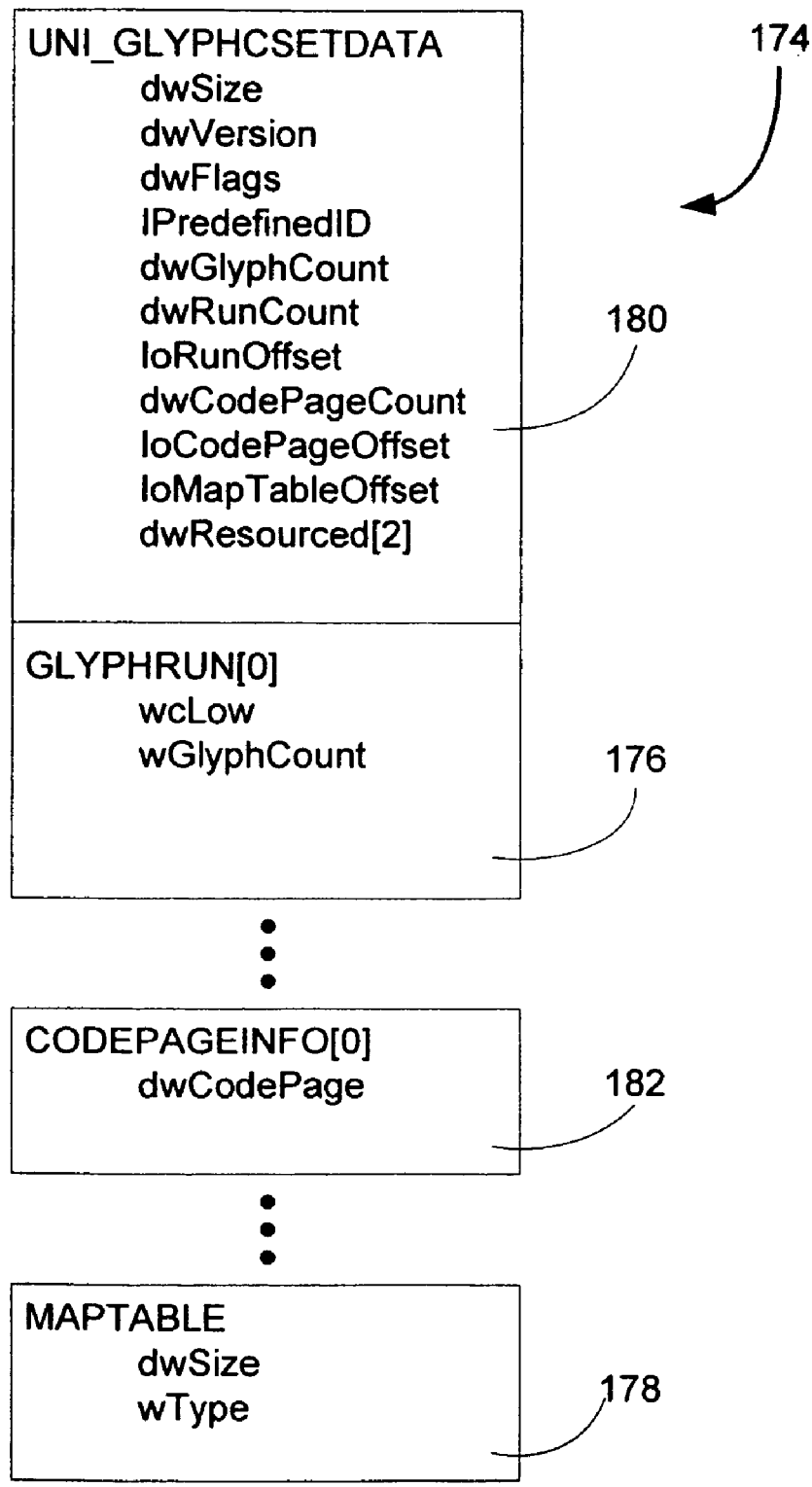
FIG. 6 is a simplified data structure image of a glyph translation table constructed in accordance with an embodiment of the instant invention.

FIG. 6 illustrates a data structure for a glyph translation table (UNI_GLYPHSETDATA) 174 constructed in accordance with an embodiment of the instant invention. This datastructure 174 represents a character conversion from the glyph handle which is passed from GDI to the printer command to the printer specific character. In this data structure, there are preferably two different tables, GLYPHRUN 176 and MAPTABLE 178. GLYPHRUN 176 is a compressed format of the FD_GLYPHSET (one of the main data structures that the printer drivers pass to GDI). This is so because the target glyph handle from Unicode is a continuous number, and therefore, the size of this data can be reduced. MAPTABLE 178 is a conversion table from the glyph handle to each code page/character code.

The UNI_GLYPHSETDATA 180 of FIG. 6 represents character encoding information for the printer device fonts, as illustrated in the following example:

```
typedef struct_UNI_GLYPHSETDATA {
   DWORD   dwSize;
   DWORD   dwVersion;
   DWORD   dwFlags;
   LONG    lPredefinedID;
```

```
    DWORD    dwGlyphCount;
    DWORD    dwRunCount;
    DWORD    loRunOffset;
    DWORD    dwCodePageCount;
    DWORD    loCodePageOffset;
    DWORD    loMapTableOffset;
    DWORD    dwReserved[2];
} UNI_GLYPHSETDATA, *PUNI_GLYPHSETDATA;
#define UNI_GLYPHSETDATA_VERSION 0x00010000
```

In this example, dwSize specifies the total size of glyphset data in bytes, dwVersion is the version number for the glyphset data format (which should be UNI_GLYPHSET-DATA_VERSION), and the dwFlags field contains miscellaneous flag bits. Further, lPredefinedID specifies the system predefined ID to be replaced with this glyphset data. If a minidriver wants to use and modify a system predefined glyph translation, the minidriver can take advantage of this so that it is possible to reduce the amount of resources required in the minidriver. As also used in this structure, dwGlyphCount specifies the number of glyphs supported by this glyphset, dwRunCount specifies the number of GLYPHRUN structures 176 to follow, and loRunOffset is the byte offset to the array of GLYPHRUNs 176. This offset is relative to the beginning of glyphset data and is preferably DWORD-aligned. The array of GLYPHRUNs 176 are preferably sorted into ascending order using GLYPHRUN.wchLow as key.

In this definition, dwCodePageCount specifies the number of Windows code pages supported by this glyphset. Further, loCodePageOffset is the byte offset to an array of CODEPAGEINFO structures 182 which contain information about each of the supported code pages. Finally, loMapTableOffset is the byte offset to the glyph handle to the encoding/charcode mapping table. Once again, this offset is relative to the beginning of glyphset data and is preferably DWORD-aligned. The table is preferably indexed using the glyph handle.

In the data structure image of FIG. 6, the GLYPHRUN data structure 176 represents the conversion table from Unicode to the UNI_GLYPHSETDATA specific glyph handle. Preferably, the glyph handle is continuous number starting from one. As an example of this structure:

```
typedef struct _GLYPHRUN {
    WCHAR  wcLow;
    WORD   wGlyphCount;
} GLYPHRUN, *PGLYPHRUN;
```

In this example, wcLow specifies the Unicode value for the first character in the run, and wGlyphCount specifies the number of characters in the run. Since the glyph handles are continuous, it is relatively easy for the driver to generate an array of WCRUNs from the array of GLYPHRUNs at runtime.

The UNI_CODEPAGEINFO data structure 182 illustrated in FIG. 6 has a list of Codepage values that are supported by this UNI_GLYPHSETDATA as follows:

```
typedef struct _CODEPAGEINFO {
    DWORD    dwCodePage;
    INVOC SelectSymbolSet;
    INVOC UnSelectSymbolSet;
} UNI_CODEPAGEINFO, *PUNI_CODEPAGEINFO;
```

In this example, dwCodePage specifies the Windows code page number. An exemplary listing of code page numbers and descriptions follow:
ANSI
1252 Latin 1
1250 Latin 2: Eastern Europe
1251 Cyrillic
1253 Greek
1254 Turkish
1255 Hebrew
1256 Arabic
1257 Baltic
ANSI and OEM
874 Thai
932 JIS/Japan
936 Chinese: Simplified chars—PRC and Singapore
949 Korean Unified Hangeul Code (Hangeul TongHab-Hyung Code)
950 Chinese: Traditional chars—Taiwan and Hong Kong OEM
869 IBM Greek
866 MS-DOS Russian
865 MS-DOS Nordic
864 Arabic
863 MS-DOS Canadian French
862 Hebrew
861 MS-DOS Icelandic
860 MS-DOS Portuguese
857 IBM Turkish
855 IBM Cyrillic; primarily Russian
852 Latin 2
775 Baltic
737 Greek; former 437 G
708 Arabic; ASMO 708
850 WE/Latin 1
437 US Further, the SelectSymbolSet includes an invocation string to select this codepage's symbol set, while the UnSelectSymbolSet has an invocation string to select this codepage's symbol set. Both offset values are from the top of each UNI_CODEPAGEINFO to the command.

The MAPTABLE 178 data structure illustrated in FIG. 6 is a continuous glyph handle base which has the following exemplary structure:

```
struct _TRANSDATA {
    BYTE  ubCodePageID;
    BYTE  ubType;
    union
    {
        short  sCode;
        BYTE   bCode;
        BYTE   bPairs[2];
    } uCode;
} TRANSDATA;
struct _MAPTABLE {
    DWORD  dwSize;
    DWORD  dwGlyphNum;
    TRANSDATA Trans[1];
} MAPTABLE, *PMAPTABLE;
#define MTYPE_FORMAT_MASK 0x07
```

-continued

```
#define MTYPE_DIRECT 0x01
#define MTYPE_PAIRED 0x02
#define MTYPE_OFFSET 0x04
#define MTYPE_DOUBLEBYTECHAR_MASK 0x18
#define MTYPE_SINGLE 0x08
#define MTYPE_DOUBLE 0x10
#define MTYPE_PREDEFIN_MASK 0xe0
#define MTYPE_REPLACE 0x20
#define MTYPE_ADD 0x40
#define MTYPE_DISABLE 0x80
```

In this exemplary structure, dwSize specifies the size of this structure including the TRANSDATA array, and wGlyphNum specifies the number of the glyphs supported in this MAPTABLE. Trans is an actual table from glyph handle to character code or command to send and code page, while bCodePageID is the index of the CODEPAGEINFO list, starting from 0. Further, bType is a bit flag which represents TTYPE_DIRECT, TTYPE_PAIRED, TTYPE_OFFSET, TTYPE_DISABLE. These formats are the same as the Windows3.1 (or 95) CTT table formats known in the art, and only one of these can be specified. TTYPE_ADD, TTYPE_REPLACE, and TTYPE_DISABLE are used only for replacement of system predefined character conversions. If TTYPE_DISABLE is set, this character range of the system predefined character conversion is disabled in FD_GLYPHSET, which is then returned to GDI. If, however, TTYPE_REPLACE is set, it replaces the system predefined character conversion. Finally, if TTYPE_ADD is set, it is added to the system predefined character conversion. As stated above, only one of these can be specified.

For Far East fonts, if the CodePage is one of the Far East codepages, bType is used to distinguish a single byte character from a double byte character. If TTYPE_SINGLE is set in bType, this signifies a single byte character. If TTYPE_DOUBLE is set, the character is a double byte character. Only one of these two can be specified. The uCode contains the DIRECT or PAIRED command to emit, or the offset from the top of MAPTABLE to the data to emit. In this, sCode is a 16 bit offset, and in command, the first word is the size of command. bCode is a direct command, and bPairs is a paired command.

The universal printer driver (Unidrv5), in accordance with an embodiment of the instant invention, supports the following system predefined glyph conversions by specifying these numbers in UNIFM_HDR.dwGlyphSetDataRCID:

```
// ANSI
#define CC_DEFAULT    0  // Default Character Conversion
#define CC_CP437     -1  // Unicode to IBM Codepage 437
#define CC_CP850     -2  // Unicode to IBM Codepage 850
#define CC_CP863     -3  // Unicode to IBM Codepage 863
// FE
#define CC_BIG5     -10  // Unicode to Chinese Big 5. Codepage 950
#define CC_ISC      -11  // Unicode to Korean Industrial Standard. Codepage 949
#define CC_JIS      -12  // Unicode to JIS X0208. Codepage 932
#define CC_JIS_ANK  -13  // Unicode to JIS X0208 except ANK. Codepage 932
#define CC_NS86     -14  // Big-5 to National Standstand conversion. Codepage 950
#define CC_TCA      -15  // Big-5 to Taipei Computer Association. Codepage 950
#define CC_GB2312   -16  // Unicode to GB2312. Codepage 936
#define CC_SJIS     -17  // Unicode to Shift-JIS. Codepage 932
#define CC_WANSUNG  -18  // Unicode to Extented Wansung. Codepage 949
#define CC_NONPRECNV 0x0000FFFF  // for lPredefinedRCID.
```

The system predefined glyph conversions are provided to reduce the size of the resource data required to be included in a minidriver. However, for situations where the minidriver's font glyph encoding is not exactly the same as the system predefined glyph encoding, the system of the instant invention provides a mechanism for the minidriver to replace some part of the system predefined glyph conversion. In GLYPHSETDATA 180 (FIG. 6), lPredefinedID is provided. By specifying the system predefined ID here in GLYPHSETDATA, the universal printer driver (Unidrv5) replaces a specific part of the system predefined conversion with the GLYPHSETDATA 180 as provided by the minidriver.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A system comprising:
   means for receiving information defining a single-byte code used by a printer;
   means for mapping the information defining the single byte-code to predefined information defining a double-byte code used by application programs to identify individual characters to be printed;
   means for receiving at least text information to be printed, the text information utilizing the double-byte code to identify individual characters to be printed;
   means for translating the text information to be printed from the double byte-byte code to the single-byte code; and
   means for transmitting the translated text information to the printer to be printed, the translated text information utilizing the single-byte code to identify individual characters to be printed to utilize the device font stored within the printer.

* * * * *